May 27, 1930.  S. SVENSON  1,760,381
VEHICLE LOCKING MECHANISM
Filed Sept. 27, 1926   6 Sheets-Sheet 1

WITNESSES:

INVENTOR.
Sven Svenson
BY
ATTORNEYS.

May 27, 1930.　　　　S. SVENSON　　　1,760,381
VEHICLE LOCKING MECHANISM
Filed Sept. 27, 1926　　6 Sheets-Sheet 3

WITNESSES:
William P. Kilroy
Harry R. L. White

INVENTOR.
Sven Svenson
By Hiel & Hiel
ATTORNEYS.

May 27, 1930. S. SVENSON 1,760,381
VEHICLE LOCKING MECHANISM
Filed Sept. 27, 1926   6 Sheets-Sheet 4

Witnesses:
William R. Kilroy
Harry R. L. White

Inventor:
Sven Svenson
By Hill & Hill
Attys

May 27, 1930. S. SVENSON 1,760,381

VEHICLE LOCKING MECHANISM

Filed Sept. 27, 1926  6 Sheets-Sheet 5

Witnesses:
William P. Kilroy
Harry R. L. White

Inventor
Sven Svenson
By Kiel & Kiel
Attys

Patented May 27, 1930

1,760,381

UNITED STATES PATENT OFFICE

SVEN SVENSON, OF FOND DU LAC, WISCONSIN, ASSIGNOR, BY MESNE ASSIGNMENTS, TO LOKAFORD COMPANY, OF SPRINGFIELD, ILLINOIS, A CORPORATION OF ILLINOIS

VEHICLE LOCKING MECHANISM

Application filed September 27, 1926. Serial No. 138,071.

My invention belongs to that general class of devices known as locking mechanisms and relates more particularly to a device for securely locking the driving mechanism or power plant or brake mechanism of a well-known type of inexpensive motor driven vehicle. The use, however, is not limited particularly to that one type of vehicle as the same may be employed for use wherever found applicable. The invention has among its objects the production of a device of the kind described that is simple, inexpensive, compact, reliable, efficient and fool-proof. More particularly it has as an object the production of a locking device which will securely lock the power plant against operation. Also it has among its further objects the production of a device that will lock the vehicle brakes in set position. It has as a further object the production of a device which when installed may be locked against unauthorized removal or tampering. Many other objects and advantages of the construction herein shown and described will be obvious to those skilled in the art from the disclosures herein given. To this end my invention consists in the novel construction, arrangement and combination of parts herein shown and described, and more particularly pointed out in the claims.

In the drawings, wherein like reference characters indicate like or corresponding parts.

Referring to the drawings, in which only preferred embodiments of the invention are shown, 1 represents the transmission casing of a well-known type of automobile, 2 the floor boards of the same, and 3 the fly-wheel or other moving part of the power plant which is forward the transmission case.

Figure 2:
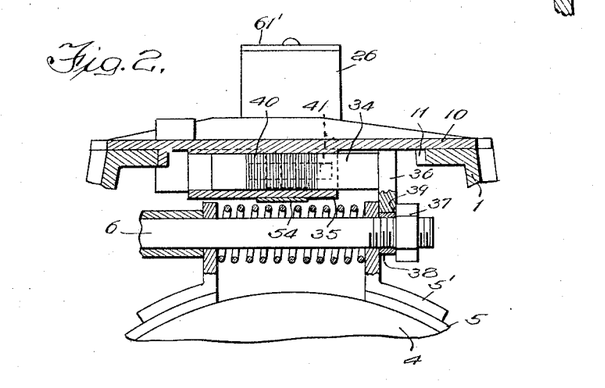
Fig. 2 is a sectional view taken substantially on line 2—2 of Fig. 1.
Figure 3:
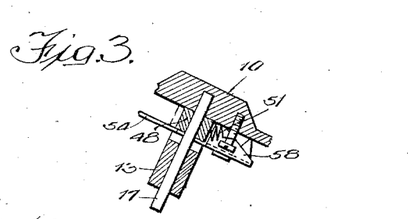
Fig. 3 is a sectional view taken substantially on line 3—3 of Fig. 4.
Figure 7:
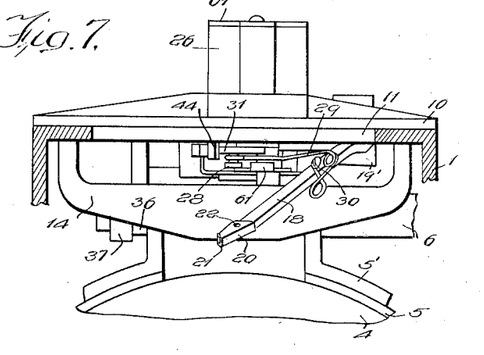
Fig. 7 is a front elevation of the same.

As illustrated in Figs. 2 and 7, 4 represents the brake drum and 5 the brake band which is provided with the usual ears 5', it being unnecessary to illustrate the details of construction of the brake mechanism, etc. It may be said, however, that in a construction of this kind 6 is the brake pedal shaft which extends through the two ears 5', one end being provided with the brake adjusting nut 37 and the other end operatively connected with the foot pedal and carried in a suitable bracket on the transmission case. The spring shown (see Fig. 2) tends to normally separate or separate the ears to release the brake while compressing the spring as by depressing the pedal tends to draw the ears together and apply the brakes.

Figure 5:
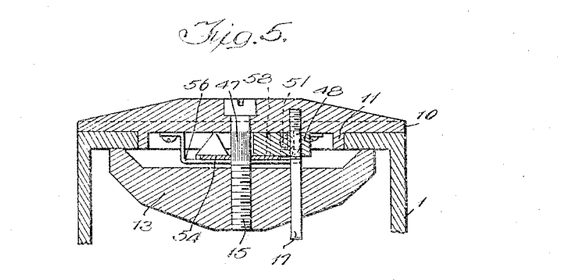
Fig. 5 is a sectional view taken substantially on line 5—5 of Fig. 1.

The usual transmission casing is provided with a cover (not shown) which is removed and is replaced by my cover 10 which is more or less similar to the other cover except that it is provided with a locking mechanism on the inner side as will be more fully hereinafter set forth. This cover plate 10 is provided with the flange 11 which fits in the opening in the casing 1 and centers the plate. The old cover plate is generally secured in place by screws or bolts, while my improved cover plate is otherwise locked in place and the bolt holes in the casing are not required. I provide, however, lugs 12 on the under side of the plate 10 which may loosely seat in the holes and serve to further align the cover. The cover is secured on the casing by means of yokes or cross-bars 13 and 14 which engage at the inside of the transmission casing (see Fig. 5) and bolts 15 and 16, respectively. These bolts are secured in place and locked against turning as will be hereinafter described, but may be easily unlocked when required. The cross-bars 13 and 14 are prevented from pivoting on the bolts 15 and 16 by the pins 17 which are carried by the plate and extend through the bars.

On the inner face of the plate 10 is arranged a locking member or dog 18, this being pivotally secured adjacent one end to the cover plate. As shown, the cover plate is provided with lugs 19' and the member 18 pivotally secured thereto by a pin 19 or the equivalent. While the member 18 may be constructed at its free end to directly engage or bite into the fly-wheel when the device is locked, in the embodiment illustrated a tip 20 is provided, the same being provided with an edge or point which will engage and bite into the face of the fly-wheel when the parts are thrown into locking position and an effort is made to turn the fly-wheel either by hand or by the starter. This tip is pivotally secured to the arm 18—22 and is normally maintained in operative engaging position by a spring 23. While the device is found to be operative without an adjustable tip, the tip facilitates unlocking in some instances as will be described hereafter. The spring 23 merely keeps it in operative position, the pivot being so located that all pressure is transmitted directly and positively to the member 18.

Referring to Figs. 1, 2 and 8, 24 is a rotatable key-controlled barrel or plug carried by the lock cylinder 25, a tumbler lock being illustrated in the drawings, the cylinder being mounted in the tubular part 26 on a plate 10. The lock mechanism, which need not be described in detail as any lock mechanism may be employed, is controlled by a key 27, which, when inserted and turned, turns the barrel or plug 24. As shown, 24 is provided with a lug or stud 28 which is arranged off-center, and this lug connects with the locking member 18 through a spring 29 or the like secured to the member by a screw 30 or equivalent means for the purpose. The barrel 24 is provided with an extension 31 which is arranged to cooperate with suitable mechanism controlling the brake locking member 34. As shown, member 34 is slidably mounted in a tubular part 35 on the plate 10 and is provided with a forked portion 36 arranged to engage between one of the ears 5' on the brake band and the brake adjusting nut 37 on the brake pedal shaft 6. 38 represents a spacer arranged between the nut and the ear to facilitate the positioning of the part 36 between the nut and the ear. To further facilitate placing of the same, I prefer to slightly bevel the lower end of the forks 36 as indicated at 39. Member 34 is provided with serrations or threads 40. 41 is a locking member pivotally secured at 42 to the plate provided at one end with teeth or serrations 43 arranged to engage in the serrations 40.

The locking member 41 is provided with a slightly yielding member 44 secured thereto and arranged to cooperate with the projecting part 31 on the plug 24. It is also provided with a spring member 45 which tends to maintain the member 41 in operative engaging position, the same bearing against the casing or lug on the plate.

Referring to Figs. 4, 5, 9 and 11, the screws 15 and 16 are provided with grooves or notches 47 extending lengthwise and arranged to be engaged by a dog 48 which is shown pivotally secured to the plate by the pin 17. This dog is serrated or provided with teeth 50 arranged to engage in the serrations 47 and is normally maintained in operative position by spring 51. The screw or bolt 16 is provided with a similar dog 52 secured to the adjacent guide pin 17. This dog is likewise formed with teeth for engagement with 16. A spring 53 tends to normally maintain the dog in operative locking position.

Mounted on the plate 10 is a lock controlling member 54 which is slidably maintained in place by the members 55 and 56. The plate 54 is arranged to control the dogs 48 and 52 and is itself controlled by the plug 25.

Figure 4:
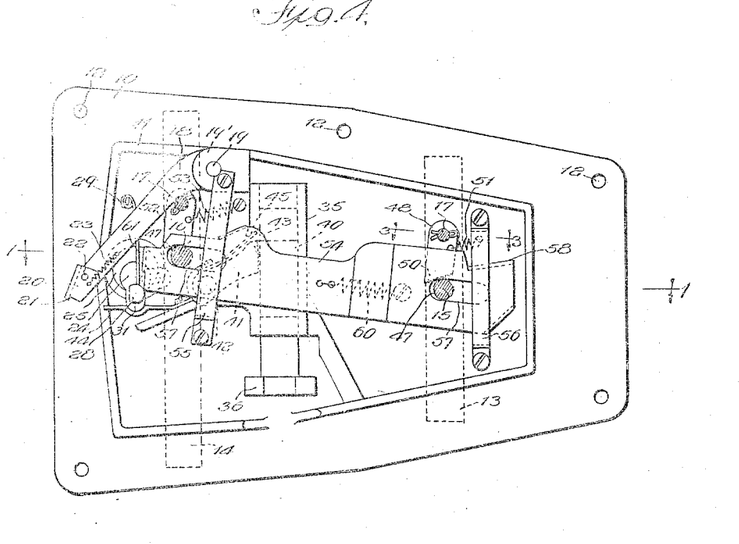
Fig. 4 is a plan view of the under side of the locking mechanism.
Figure 9:
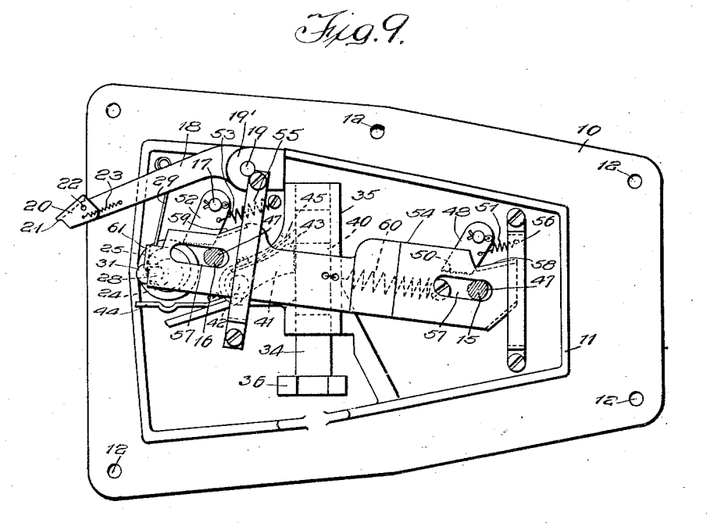
Fig. 9 is a view similar to Fig. 4, showing the parts in changed positions and unlocked to permit removal of the transmission cover plate securing means.
Figure 10:
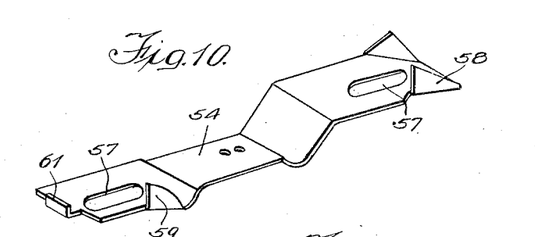
Fig. 10 is a perspective view of a part of the releasing mechanism.
Figure 11:
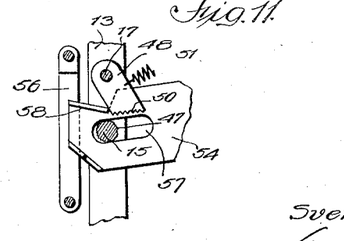
Fig. 11 is a detailed view of a portion of the cover plate locking mechanism.

Referring particularly to Figs. 4, 9 and 10, the plate is provided with openings 57 through which the bolts 15 and 16 extend and is so formed as to clear the cooperating parts of the locking mechanism. At one end is an engaging member 58 arranged to engage the dog 48, while at the other end is provided a similarly engaging member 59 arranged to engage the dog 52. A spring 60 tends to normally maintain the plate rearwardly so that the springs 51 and 53 maintain the dogs 48 and 52 in engagement with their respective screws or bolts. At the forward end of the plate 54, is provided an engaging member 61 which is arranged to engage with the stud or pin 28 on the plug 24. In the normal operation of the device and turning of the key and its plug to release or operate the locking member 18 and the brake locking member 34, it is only necessary to turn the key a portion of a turn. This does not affect the unlocking of the screws 15 and 16 to permit their removal. When, however, the same is given a complete turn and moves under the plate and in engagement with the projection 61 (see Fig. 9), further movement of the lock plug moves plate 54 forwardly, thereby moving the dogs 48 and 52 substantially as shown in Fig. 9.

It will be noted that the screws or bolts 15 and 16, the heads of which are exposed at the exterior side of the plate 10, may now be turned so as to release the securing members 13 and 14, so that the plate may be lifted off should it be desired to have access to the transmission case, or the same may be easily returned to and secured in place on the transmission case.

Figure 1:
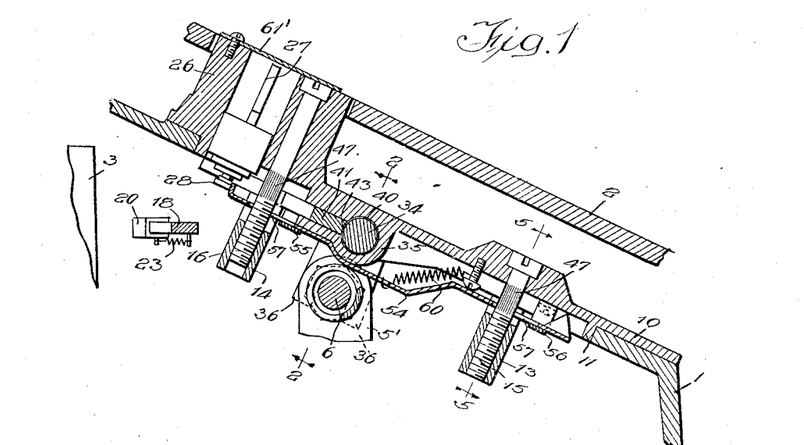
Fig. 1 is a sectional view taken substantially on line 1—1 of Fig. 4 and showing part of the vehicle transmission case and floor boards.
Figure 6:
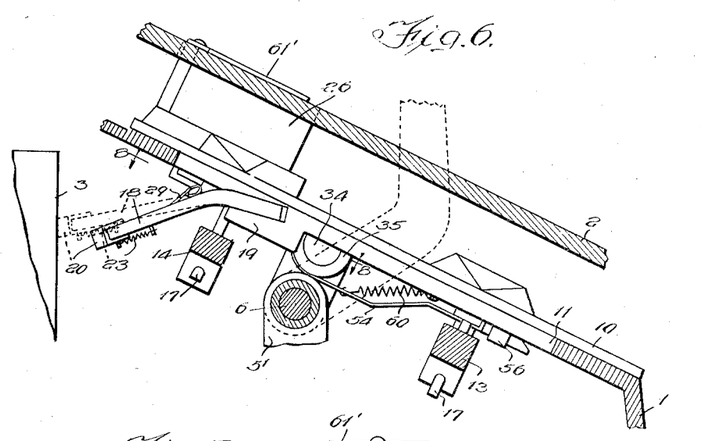
Fig. 6 is a side elevation of the locking mechanism.

It will be noted by referring to Figs. 1 and 6 that the plate is provided with a key barrel container 26 as before mentioned which extends substantially flush to the upper side of the floor board. This may be covered by a cover 61' to prevent the admission of dust or dirt or other foreign matter to the lock mechanism. When it is desired to remove the key, the cover is merely moved to one side and the key removed, and then the cover replaced.

Figure 8:
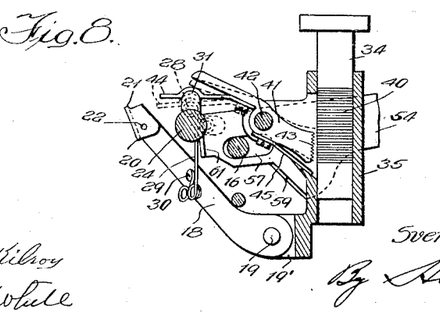
Fig. 8 is a sectional view taken substantially on line 8—8 of Fig. 6.

When the parts are in the position shown in Fig. 8, as well as Fig. 4, the device is unlocked and the arm or locking member 18 is moved to a position where the impinging member does not engage the fly-wheel, as shown in Fig. 1. Likewise, the member 34 may be moved in and out as the brake is applied or released. When, however, the device is locked, member 18 and the tip 20 are moved substantially as shown in the dotted lines in Fig. 6 and brought into engagement with the fly-wheel of the engine. As the engine is cranked, either by hand or by starter, the engagement and biting into the fly-wheel by the locking member will lock and prevent the turning of the wheel. The more pressure that is applied to turn the engine over, the greater the locking force supplied.

The purpose of the tip 20 is that while the same is substantially rigid when locked and engaging the fly-wheel, it permits the releasing regardless of the biting in of the wheel by the easy manipulation of the key and without in some instances requiring a slight movement of the fly-wheel to disengage. When the member 34 is locked, while it cannot be moved to unlock, yet it readily permits further application of the brakes within the limit of movement of said brake mechanism without interference. A limited movement of the key suffices to lock or unlock the device, but a substantial complete rotation of the key is required in this form to move the controlling plate 54 to release the pawls locking the securing screws.

The embodiment of the invention shown in Figs. 12 to 19 is considerably simplified. Referring to these figures, 66 represents the transmission casing cover plate similar to the plate 10 provided with the flange 67. This plate may be secured to the casing by means of the screws or bolts 68 and 69 and cross-bars 70 and 71, these being constructed similar to corresponding parts in the other form of device. There is in this construction a locking member or dog 72 pivotally secured to the plate by a pin 73 or equivalent means, the plate being usually reinforced or thickened as shown at 74 (see Fig. 15). The member 72 carries a tip 75 pivotally secured thereto by a pin 76 or the equivalent, the tip being provided with an impinging or engaging point 77 arranged to bite into the fly wheel. Carried by the casing is a lock plug 78 operative by manipulation of the key 79. This plug is carried in the casing 80 and being of well known construction need not be described in detail. As shown (see Fig. 16), at the lower end of the plug 78 is arranged a pin or lug 82. This lug is connected with the member 72 so as to control the movement of the same. As illustrated, 83 represents a link, and I have shown a cotter pin for the purpose having a head 85 mounted on 82, the opposite end of the link engaging with a pin 84 which may also be a cotter pin having its head 86 arranged to receive the pin 83, the ends of which may be bent over as indicated at 83'. The pin 84 also serves as a means of connecting spring 88 to the member 72. The opposite end of spring 87 is connected to the member 75, as indicated at 88 in Fig. 12. Arranged on the pin 83 is a spring 89. This construction secures a positive pull on the locking member to unlock the device, but in locking, the locking member is pushed into engagement with the fly-wheel and yieldingly held there. There is enough movement and play to permit movement and engagement of the locking member with the fly-wheel in this instance, when it is endeavored to start the locked motor without in any way positively transmitting movement or shock to the lock mechanism. The more power applied to the fly-wheel, the more positive the locking action. The resilient or yielding connection is also desirable in the case of backfire.

Carried by the plate are dogs 91 and 94 arranged to engage with the screws 68 and 69 and prevent their being unscrewed and the plate removed other than by prior manipulation of the key. These dogs are preferably secured to the plate by pins 92 and 95 respectively and are normally maintained in operative engaging position by springs 93 and 96 connected thereto and to a movable plate 98.

Figure 12:
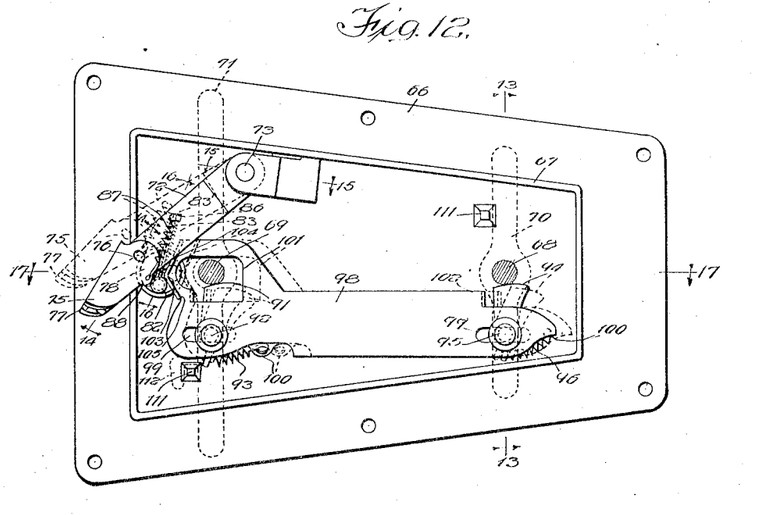
Fig. 12 is a view similar to Fig. 4, illustrating another embodiment of the invention.
Figures 13, 14, 15, 16:
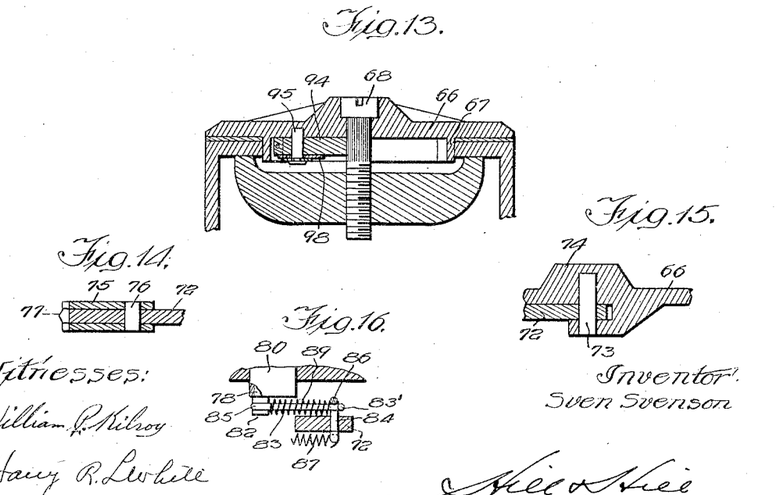
Fig. 13 is a sectional view taken substantially on line 13—13 of Fig. 12.
Fig. 14 is a sectional view taken substantially on line 14—14 of Fig. 12.
Fig. 15 is a sectional view taken substantially on line 15—15 of Fig. 12.
Fig. 16 is a sectional view taken substantially on line 16—16 of Fig. 12.
Figure 17:
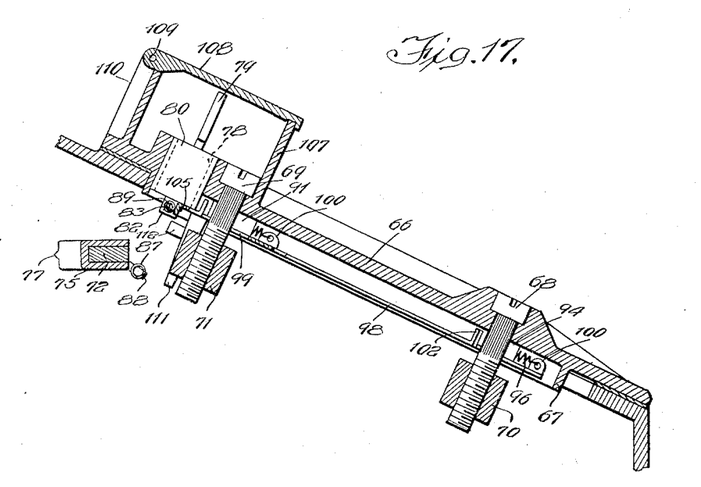
Fig. 17 is a sectional view taken substantially on line 17—17 of Fig. 12.
Figure 18:
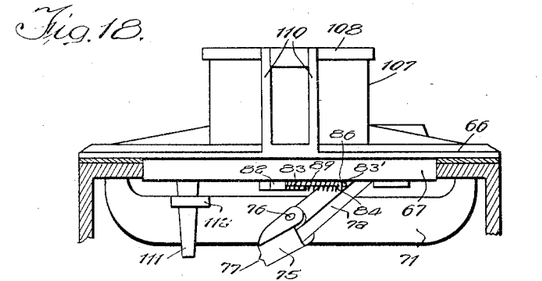
Fig. 18 is a front elevation of the device, the transmission casing being shown in section.
Figure 19:
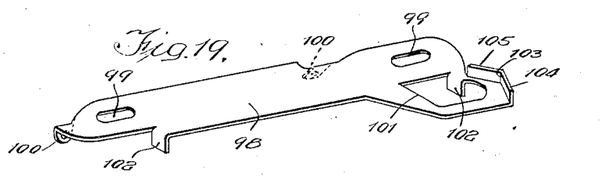
Fig. 19 is a perspective view of the release bar 98.

The plate 98 (see Fig. 19) is provided with slots 99 to permit its movement and with convenient lugs 100 for attachment of the springs 93 and 96. The same is also provided with an opening 101 to permit clearance with the bolt 69 which projects through the same. Lugs 102 are arranged to cooperate with the dogs 91 and 94 similar to the parts 58 and 59 on the plate 54 previously described. As shown, the plate 98 is provided with a cam 103 and cam faces 104 and 105 arranged to cooperate with the pin or lug 82 upon manipulation of the key. When the device is unlocked the parts are normally substantially in the position shown in Fig. 12 (full lines). The locking member 72 and its part 75 are back to a point where they will not engage the fly-wheel or other movable part of the mechanism. It will be noted that in this position the dogs 91 are maintained in locking engagement with the screws or bolts 68 and 69, and while the screws may be tightened up they cannot be easily loosened. The dogs are maintained in engagement by the springs 93 and 96 and also by the wedging action, as will be obvious by referring to the figure. If the key is thrown entirely over until the parts are substantially in the position shown in the dotted lines in Fig. 12, the member 72 will be in operative engaging position and the dogs 91 and 94 will be substantially as shown in Fig. 12. The engine is therefore locked against operation and likewise the cover plate cannot be removed from the transmission casing. Whenever it is desired to remove the cover plate, however, the key is turned to a point where the pin 82 is in engagement with the high spot on the cam 103 at the juncture between the faces 104 and 105, and in this case the plate 98 will be moved substantially as shown in dotted lines in Fig. 12.

Referring to this Fig. 12, it will be noted that the lugs 102 are in engagement with the dogs and maintain them in inoperative position. The plate 66 is shown provided with a key housing 107 extending up to the top face of the floor boards, and provided with a cover 108 secured thereto as indicated at 109 between the ribs 110. In order to prevent the cross-bars 70 and 71 turning during the securing of the plate to the casing, I provide the pins 111. I likewise prefer to provide a hook 112 on the front bar which will engage the adjacent pin 111 so as to maintain it so that it will not at any time move sufficiently to interfere with the locking mechanism.

The above embodiment, as will be noted, is considerably simplified from that shown in the first described form of device, and the brake locking mechanism is omitted. While the action is substantially similar, there is an immaterial slight difference, as for example, the plate 98 moves in a direction opposite to the plate 54 to release the screws, the dogs being correspondingly designed to work in this manner. Outside of this, however, the result is the same. It has been found from practice that the device is operative to securely lock the vehicle against tampering, that the cover plate cannot be removed without destroying the structure entirely, that the device may be easily unlocked by means of the key without danger of jamming or becoming locked from the pressure applied to the parts.

While I have shown the device as particularly adapted for use on a particular type of car, I do not wish to be understood that its application is limited to that particular car. The device is simple, efficient and foolproof. It provides for the locking of the locking mechanism itself within a casing where it cannot be tampered with, and does not vary the standard construction any, other than the substituting of the cover plate which is in itself a minor change in no way affecting the running of the vehicle or the operation of other parts,

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a motor vehicle locking device of the kind described, a plate constructed to constitute a transmission cover plate, means for detachably securing said cover plate in place on the transmission casing and key-actuated and controlled means for controlling said securing means, brake locking means carried by said plate and operatively controlled by said key-controlled mechanism, said locking means operatively connected with the brake band, and means carried by said cover plate for engaging the engine fly-wheel and operatively controlled by said key-controlled means.

2. In a locking device of the kind described for motor vehicles, a transmission cover plate, locking mechanism carried by said cover plate at the inner side thereof comprising means for securing the cover in place, means for locking the brake mechanism, and means for locking the engine against operation acting directly on the fly-wheel, key-controlled means common to all of said mechanisms for controlling the same.

3. In a locking device of the kind described for motor vehicles, a transmission cover plate, locking mechanism carried by said cover plate at the inner side thereof comprising means for detachably securing the cover in place, means for engaging and locking the brake mechanism, means for engaging the engine fly-wheel and locking the engine against operation, key-controlled means common to all of said mechanisms for controlling the same solely upon manipulation of the key in a predetermined manner.

4. In a device of the kind described consisting of a transmission cover plate, a member pivotally secured thereto adjacent one end, a member pivotally carried at the opposite end of said first member for engaging the vehicle motive power fly-wheel upon rotation thereof in the normal operating direction while permitting easy release thereof by a key, a controlling member therefor operatively connected therewith and key-controlled actuating mechanisms for controlling the same.

5. In a device of the kind described consisting of a transmission cover plate, a member pivotally secured thereto adjacent one end and provided at the opposite end with means for positively but yieldably and detachably engaging the vehicle motive power fly-wheel upon rotation thereof in the normal operating direction while permitting easy release thereof by a key, a controlling member therefor operatively connected therewith and key-controlled and actuating mechanisms for controlling the same.

6. In a locking device of the kind described and in combination, a casing cover plate constructed for engagement with the casing member, key-controlled means for locking said cover against removal when applied to the casing, brake locking mechanism carried by said plate at the inner face thereof and operatively connected with said key-controlled means whereby the same is controlled by the key-controlled means, and engine locking means mounted on the inner side of said cover plate and operatively connected with said key-controlled means, said engine locking means being operable solely by a key to lock and unlock the engine transmission.

7. In a locking device of the kind described and in combination, a casing cover plate constructed for engagement with the casing member, brake locking mechanism carried by said plate at the inner face thereof and key-controlled means for locking the same in operative position, and means mounted on the inner side of said cover plate and operatively connected with said key-controlled means for positively but yieldingly locking the engine against operation.

8. In a motor vehicle locking device of the kind described and in combination, a transmission casing cover plate having means for engagement with the transmission casing and comprising a cross bar, a screw extending through said cover plate and engaging said cross bar, a dog operative to engage said screw and maintain the same against turning, means for normally maintaining said dog in operative locking position, means for positively moving the dog out of operative position, and key-controlled means for actuating said last mentioned dog moving means.

9. In a vehicle locking device of the kind described and in combination, a transmission cover plate provided with means for securing the same on the transmission casing, said securing means comprising a plurality of cross bars arranged at the inner side of the plate, screws extending through the cover plate and engaging said cross bars, a dog for each screw operative to engage the screw and lock the same against removal, a plate slidably mounted on the inner side of said cover plate and operative to engage said dogs and positively move the same from an operative to an inoperative position, means cooperating with said plate for normally maintaining said dogs in operative locking position, said slidable plate provided with a cam face at one end, and a key-actuated and controlled member carried by the plate and provided with means for engaging said slidable plate cam.

10. In a vehicle locking device of the kind described and in combination, a transmission cover plate provided with means for securing the same on the transmission casing, said securing means comprising a plurality of cross bars arranged at the inner side of the plate, screws extending through the cover plate and engaging said cross bars, a dog for each screw operative to engage the screw and lock the same against removal, a plate slidably mounted on the inner side of said cover plate and operative to engage said dogs and positively move the same from an operative to an inoperative position, means cooperating with said plate for normally maintaining said dogs in operative locking position, said slidable plate provided with a cam face at one end, a key-actuated and controlled member carried by the plate and provided with means for engaging said slidable plate cam, and engine locking means operatively connected with said key-actuated and controlled means for locking the engine against operation.

11. In a vehicle locking device of the kind described and in combination, a transmission cover plate provided with means for securing the same on the transmission casing, said securing means comprising a plurality of cross bars arranged at the inner side of the plate, screws extending through the cover plate and engaging said cross bars, a dog for each screw operative to engage the screw and lock the same against removal, a plate slidably mounted on the inner side of said cover plate and operative to engage said dogs and positively move the same from an operative to an inoperative position, means cooperating with said plate for normally maintaining said dogs in operative locking position, said slidable plate provided with a cam face at one end, a key-actuated and controlled member carried by the plate and provided with means for engaging said slidable plate cam, and engine locking means operatively connected with said key-actuated and controlled means for locking the engine against operation, including a movable arm provided with a tip constructed to engage the engine fly-wheel when the key-actuated and controlled member is moved to locking position.

12. In a motor vehicle locking device of the kind described and in combination, a transmission cover plate, means for detachably securing said cover plate in place on the transmission casing, key-controlled means for controlling said securing means, brake locking means carried by said plate and operatively controlled by said key-controlled means, and a lever carried by said plate having at one end a pivoted dog for engaging the engine fly-wheel said lever being operatively controlled by said key-controlled means for locking and unlocking the engine.

In testimony whereof, I have hereunto signed my name.

SVEN SVENSON.